No. 752,244. PATENTED FEB. 16, 1904.
C. MORRISON.
CHURN POWER.
APPLICATION FILED AUG. 28, 1903.
NO MODEL.
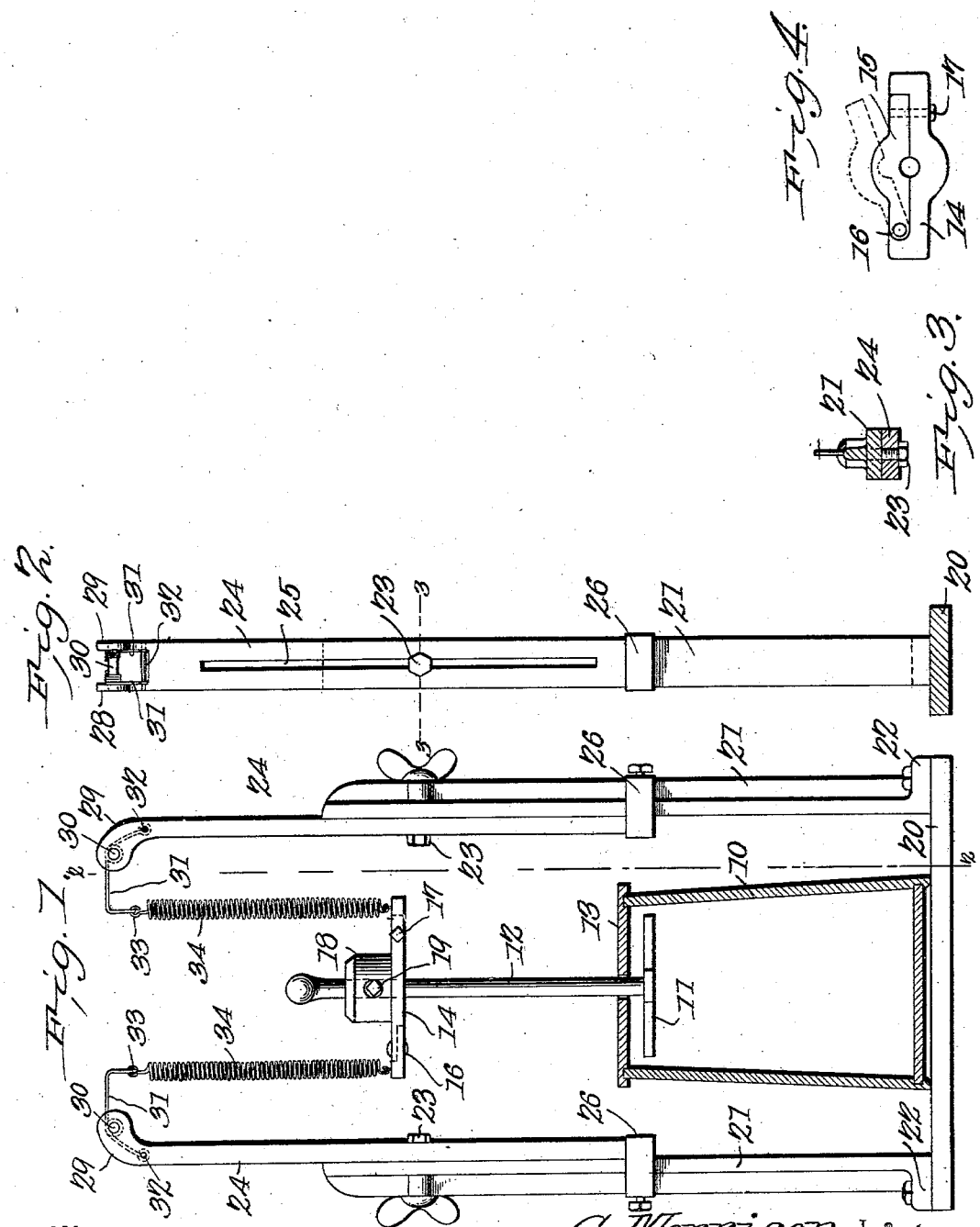
Witnesses
E. F. Stewart
C. N. Woodward
C. Morrison, Inventor.
by C. A. Snow & Co.
Attorneys No. 752,244. Patented February 16, 1904.

UNITED STATES PATENT OFFICE.

CORNELIUS MORRISON, OF CLEVELAND, TENNESSEE.

CHURN-POWER.

SPECIFICATION forming part of Letters Patent No. 752,244, dated February 16, 1904.

Application filed August 28, 1903. Serial No. 171,125. (No model.)

*To all whom it may concern:*

Be it known that I, CORNELIUS MORRISON, a citizen of the United States, residing at Cleveland, in the county of Bradley and State of Tennessee, have invented a new and useful Churn-Power, of which the following is a specification.

This invention relates to devices employed for assisting in operating vertically-movable members—such as churn-dashers, drill-rods, some forms of pump-rods, and the like—and has for its object to produce a simply-constructed and easily operated and applied device whereby the power required to operate a movable member of the character above noted is materially decreased; and the invention consists in certain novel features of construction, as hereinafter shown and described, and specified in the claims.

In the drawings illustrative of the invention, in which corresponding parts are denoted by like designating characters, Figure 1 is a side elevation, partially in section, of the improved device applied. Fig. 2 is a sectional view on the line 2 2 of Fig. 1. Fig. 3 is a transverse section on the line 3 3 of Fig. 2. Fig. 4 is a plan view of the dasher-stem clamp detached.

The improved device may be applied to the operation of the dashers of churns and similar apparatus, to some forms of drill-rods, pump-rods, and the like, but for the purpose of illustration is shown applied to operate the dasher of a churn; but while the device is more particularly applicable to structures of this character I do not desire to be limited thereby, but reserve the right to its use for whatever purpose it is adapted.

In the drawings illustrating one embodiment of the invention the churn-receptacle is represented at 10 and the dasher at 11, the latter having the stem 12 extending through the cover 13 in the ordinary manner, as shown. Above the cover member a bar 14 is adjustably connected to the stem 12 by a clamp-plate 15, the latter hinged by one end to the bar, as at 16, and provided with a clamp-bolt 17 at the other end. The members 14 15 are each preferably provided with semicircular cavities embracing opposite sides of the stem to increase the "grip" between the parts, as shown. Resting upon the bar 14 and its clamp-arm 15 is a weight 18 of suitable size and adjustable upon the stem by a set-screw 19, as shown. Disposed adjacent to the member 12 are one or more standards connected by resilient connections to the bar 14, and these standards will be preferably connected to a base member 20, upon which the receptacle 10 rests, as shown in Fig. 1. The standards consist of lower portions 21, preferably with laterally-extended bases 22, by which they are attached to their supports. The portions 21 are each provided, near their upper ends, with a clamp-bolt 23, having wing-nuts at one end. Slidably disposed upon the members 21 are slidable extension members 24, the latter having longitudinal slots 25, with which the bolts 23 engage, as shown, by which means, it will be obvious, the portion 24 may be adjusted longitudinally of the portions 21 when required. The portions 24 are each provided with a guide-band 26, embracing the member 21 below the clamp-bolt 23 to prevent lateral movement between the parts without effecting the longitudinal adjustment.

The upper ends of the parts 24 are forked, as at 28 29, and connected by a transverse pin 30, around which a resilient arm 31 is coiled, as shown, with one end supported at 32 upon the body of the member 24 and the other end extended at right angles and terminating in a loop 33.

Generally two of the standards will be employed, one upon each side of the members 10 and 12, as shown, and when thus disposed the loops 33 of the spring-arms are connected by coiled springs 34 to the opposite ends of the bar 14, as shown. By this simple arrangement it will be obvious that the member 12 and its connections will be yieldably supported in its upward position, and the only force required to depress it will be that required to overcome the resistance of the spring-arms 31 and spring-connecting members 34. Thus applied to a churn the only labor required will be that necessary to depress the churn-dasher, and even this small amount is lessened by the weight 18, which assists the downward movement. Thus the labor of operating the member 12 is reduced to a minimum.

The device is very simple in construction, easily applied and operated, and will be found very convenient for the purposes above noted.

The parts may be of any suitable material and of any suitable size, but will preferably be of a metal of sufficient strength to withstand the strains to which they will be subjected.

Having thus described the invention, what I claim is—

1. In a churn-power, oppositely-disposed standards having bifurcated ends, a transverse journal in the bifurcated end of each standard, a spring wound around the journal and having a standard-contacting end and a dasher-supporting end carried by each arm and means for connecting the dasher to the arm.

2. In a churn-power, a standard having a bifurcated end, a journal carried by the end, a spring-arm intermediately engaged by the journal and terminally bearing against the standard, and dasher-engaging coils terminally connected to the end of the spring-arm.

In testimony that I claim the foregoing as my own I have hereto affixed my signature in the presence of two witnesses.

CORNELIUS MORRISON.

Witnesses:
J. E. JOHNSTON,
T. S. ROGERS.